HIRAM TUCKER, OF NEWTON, MASSACHUSETTS.

Letters Patent No. 90,891, dated June 1, 1869.

---

IMPROVEMENT IN COATING ARTICLES OF IRON-WARE.

---

The Schedule referred to in these Letters Patent and making part of the same

---

*To all whom it may concern:*

Be it known that I, HIRAM TUCKER, of Newton, in the county of Middlesex, and State of Massachusetts, have invented an Improvement in Coating Articles of Iron-Ware; and I do hereby declare that the following, taken in connection with the drawings which accompany and form part of this specification, is a description of my invention, sufficient to enable those skilled in the art to practise it.

In the United States Letters Patent, granted to me December 15, 1863, which Letters Patent were reissued September 11, 1866, I describe and claim a new method of bronzing or coloring the surfaces of articles of iron-ware, by first covering the surface of the article with a thin coating of oil, and then subjecting it to heat, the effect of which is to form upon the surface a thin, firm, durable film, having a color or appearance not unlike bronze. The surface thus made I sometimes varnished with spirit-varnish.

My present invention relates to the treatment of articles bronzed or colored in accordance with my said patented process.

I have found, in practice, that the application of common spirit-varnish to iron, so bronzed or colored, is not effectual in preventing oxidation of the metal, and I have discovered that by coating articles so colored or bronzed, with copal-varnish, or a varnish having an oil base, the surfaces are rendered practically inoxidizable, or are made impermeable to the action of ordinary atmospheric heat or moisture.

My invention consists, therefore, in combining with the process of bronzing or coloring iron described in my aforesaid patent (or the reissue thereof) the process of covering the surfaces of articles of iron so treated, with an oil-varnish, (in contradistinction to a spirit-varnish,) the oil-varnish taking considerably longer to dry, but when dry, imparting a very enduring, transparent coating to the colored iron, rendering the articles so coated of much greater value than articles of iron, which, being bronzed or colored as described, are covered with spirit-varnish, or are left uncoated with varnish.

I claim, outer-coating, with oil-varnish, articles of iron bronzed or colored by the process, substantially as described.

HIRAM TUCKER.

Witnesses:
FRANCIS GOULD,
M. W. FROTHINGHAM.